United States Patent [19]

Hill, Sr.

[11] 3,907,680
[45] Sept. 23, 1975

[54] CLARIFICATION OF AQUEOUS ACIDIC PHOSPHATIC SOLUTIONS

[76] Inventor: Richard N. Hill, Sr., 3412 Polk Ave., Lakeland, Fla. 33803

[22] Filed: Nov. 6, 1973

[21] Appl. No.: 413,259

[52] U.S. Cl. .................. 210/71; 423/321; 210/75
[51] Int. Cl.² .................. B01D 38/18; C02B 1/02
[58] Field of Search ................ 423/321; 210/75, 71

[56] References Cited
UNITED STATES PATENTS

| | | | |
|---|---|---|---|
| 1,858,203 | 5/1932 | Fisk et al. | 423/321 |
| 2,123,785 | 7/1938 | Knox et al. | 423/321 |
| 2,132,349 | 10/1938 | Booth | 423/321 |
| 2,987,376 | 6/1961 | Gloss | 423/321 |
| 3,193,351 | 6/1965 | Miller et al. | 423/321 |
| 3,528,771 | 9/1970 | Shearon et al. | 423/321 |
| 3,764,658 | 10/1973 | Darwin et al. | 423/321 |

OTHER PUBLICATIONS

Purchas — *Industrial Filtration of Liquids* — 1971, pp. 105–107.
Egleston — *Catalogue of Minerals and Synonyms*, (U.S. Nat'l Museum Bulletin 33), 1889, pp. 119–122, 126.

*Primary Examiner*—Oscar R. Vertiz
*Assistant Examiner*—Eugene T. Wheelock

[57] ABSTRACT

Crude aqueous acidic phosphatic solution such as wet process weak phosphoric acid, 25% $P_2O_5$ to 35% $P_2O_5$, is passed through a layer of especially prepared perlite filter aid thereby removing substantially all of the finely divided organic and inorganic solids. The clarified solution may be processed as usual to produce merchant grade wet process acid or it can be concentrated to 38% $P_2O_5$ to 42% $P_2O_5$ and again passed through a fresh layer of especially prepared perlite filter aid for additional clarification. This clarified solution may be processed from this point as usual to produce merchant grade wet process acid or it can be further concentrated to 51% $P_2O_5$ to 53% $P_2O_5$, allowed to stand in a quiescent state for up to 90 minutes, decanted, and the overflow concentrated to 54% $P_2O_5$ to 62% $P_2O_5$ to produce a highly refined merchant grade wet process phosphoric acid.

5 Claims, No Drawings

3,907,680

CLARIFICATION OF AQUEOUS ACIDIC PHOSPHATIC SOLUTIONS

BACKGROUND OF THE INVENTION

In conventional methods for the production of aqueous acidic phosphatic solutions, including wet process phosphoric acid, phosphate rock is reacted with dilute phosphoric (10% $P_2O_5$ to 25% $P_2O_5$) and sulphuric acid, which may or may not be diluted. The reaction product is leached to yield a crude aqueous solution in which is suspended a substantial quantity of solid impurities. This slurry is filtered to separate most of the undissolved gypsum and other solid impurities to yield a crude dilute (20% $P_2O_5$ to 35% $P_2O_5$) aqueous acidic phosphatic solution product. This product, sometimes known as the number one filtrate, contains lesser quantities of solid impurities that were not removed during the solid-liquid separation step plus solids that have crystallized after filtration. The solution contains dissolved impurities. The so-called wet process weak phosphoric acid is produced by such a method. It is generally produced at a concentration of about 25% $P_2O_5$ to 35% $P_2O_5$. Reference is made to Chapter 16 of Volume 11, "Phosphorus and Its Compounds", edited by John R. Van Wazer, published by Interscience Publishers, 1961.

The problems occasioned by suspended solid organic and inorganic impurities ae particularly acute with respect to phosphatic solutions. This is so whether the solutions are produced via wet process phosphoric acid or other methods such as, but not limited to, dissolution of phosphate rock with phosphoric acid, leaching of superphosphates with water and/or phosphoric acid generally followed by a solid-liquid separation step. Additionally, variable quantities of impurities in the phosphate rock such as calcium, potassium, sodium, aluminum, iron, silicon, flourine, etc. are put into solution during the reaction of the phosphate rock with sulphuric acid and/or phosphoric acid. Standing, cooling, or concentration of these phosphatic solutions result in additional solids being formed and precipitated to form a sludge consisting mainly of complex iron, aluminum, potassium, sodium, calcium, etc.; phosphates, fluorides, silicates, sulphates, etc. This is known in the art as post-precipitation.

Wet process phosphoric acid, or aqueous acidic phosphatic solutions, upon standing or during shipment in tank cars or the like, deposits a layer of solid matter, forming sludge, which renders handling stored or shipped acid exceedingly difficult and frequently economically unfeasible. Some solids may be removed from the crude solution by conventional filtration or centrifugation. With respect to conventional filtration however, the concentrated acid is very viscous and difficult to filter. Further, the solids are of such nature that they readily blind the filter cloth and the solids are difficult to remove from the filter. With respect to conventional centrifugation, many of the finely divided solids will not be removed, particularly the organic particles which are lighter and are not removed with the larger heavier inorganic solids from the solution.

SUMMARY OF THE INVENTION

This invention relates to an improved method for substantially removing finely divided organic and inorganic suspended solids from phosphatic solutions. In accordance with this invention, an aqueous acidic phosphatic solution, prepared by any of several methods, is passed through a layer or bed of especially prepared perlite. The finely divided organic and inorganic solids remain on the surface of the perlite while the phosphatic solution passes through. The solids on the surface of the perlite layer may be scraped off exposing a fresh surface of perlite. The liquid product from the solid-liquid separation is a highly clarified solution. Other materials such as diatomaceous earth, cellulose fibres, etc. are not suitable as they react with the impurities or the aqueous acidic phosphatic solution.

It has been found that the method of passing the aqueous acidic phosphatic solution through the layer of especially prepared perlite may be accomplished by a Nutsche type filter, a pressure filter, a vacuum filter, or a basket type centrifuge.

While any of several methods may be used to maintain a layer of perlite thereby facilitating passage of the solution, the one preferred is that of a modified basket type centrifuge. The basket, with a perforated wall, is lined with a woven material such as stainless steel wire cloth or a synthetic fibre woven cloth such as polypropylene, polyethylene, saran, etc. Especially prepared perlite, as a slurry in water or aqueous acidic phosphatic solution and at a weight concentration of 0.2 to 12%, is fed to a rotating basket and distributed uniformly over the woven cloth mounted inside the perforated basket until a layer of ½ inch to 6 inches has been applied. After precoating the crude phosphate solution is applied to the surface of the perlite precoat at basket speeds corresponding to a centrifugal force of upwards to 800 pounds per pound, sometimes referred to as 800 times gravity. Excellent results were obtained in the range of 50 to 300 gravities.

As hereinbefore set forth, wet process phosphoric contains, among other impurities, sodium, potassium, silica and fluorine. These have been considered necessary to form substantial sludges after conventional clarification. There have been indications that the complexes formed may have occurred during the digestion phase of conventional wet process acid production and have reported with the filtrate during the filtration step and because of their finely divided nature, were not removed during conventional clarification.

Regardless of the mechanism of forming post-precipitated solids, solutions of phosphoric acid having very low concentrations of sodium, potassium, silica and fluorine exhibit less post-precipitation than phosphoric acid containing greater concentrations of these impurities.

The present invention, therefore, embraces reducing the quantity of solids contributing to post-precipitation by centrifugation of the aqueous acidic phosphatic solution or wet process acid solution, through a layer of perlite at one or more concentrations from 12% $P_2O_5$ to 65% $P_2O_5$.

For maximum clarification and minimal post-precipitation, it has been found that a primary centrifugation through perlite in the range of 25% $P_2O_5$ to 35% $P_2O_5$ and more preferably 28% $P_2O_5$ to 32% $P_2O_5$ will produce a product that may be concentrated to 54% $P_2O_5$ by conventional means.

For greater clarification and diminished post-precipitation a second pass through a fresh layer of perlite at 35% $P_2O_5$ to 45% $P_2O_5$ and more preferably 39% $P_2O_5$ to 42% $P_2O_5$, substantially removes solids that have crystallized out due to concentration. The product may be concentrated to 54% $P_2O_5$ by conventional means.

It has been further found that concentrating the acid after the first or second pass through perlite to 50% $P_2O_5$ to 54% $P_2O_5$ and more preferably 51% $P_2O_5$ to 53% $P_2O_5$, then settling in a quiescent state for up to ninety minutes, then decanting, that additional solids may be removed. The acid may now be concentrated to 54% $P_2O_5$ to 62% $P_2O_5$. The solids from this latter step may be returned to the digestion circuit.

A clarification agent may be used in the present invention when desired, although the use of clarification agents is not essential in the present invention. The clarification agent may be added at any suitable step of the process before passing the solution through the layer of perlite. The clarification agent may be added when the solution is at elevated temperatures or if the solution is cold. The clarification agent may be a conventional flocculating agent, stable in mineral acids, and specifically stable in the aqueous acidic phosphatic solution being treated. Examples of such flocculating agents include water soluble high molecular weight, synthetic polymers such as the polyacrylamides which are sold under the commercial name "Separan," guar, the hydrolyzed polyacrylonitrile resins or the salts thereof such as the sodium and potassium salts, and the like. Such commercial flocculating agents are employed in the conventional manner normally in water solution, in about 0.05% to about 2% by weight in an amount requisite to provide from about 0.001 to about 2 pounds thereof per ton of aqueous acidic phosphatic solution treated.

The process of this invention may be effected in the clarification of aqueous acidic phosphatic solution in all concentrations. Acid phosphate solutions formed by the leaching of phosphate rock or superphosphate may constitute substantially calcium-free phosphoric acid or, depending on the degree of acidulation, or, type of superphosphate, approach monocalcium phosphate solutions characterized by a $CaO/P_2O_5$ mole ratio of about 1:1.

This invention is useful in the clarification of all such solutions and more specifically is applicable to aqueous acidic phosphatic solutions ranging from phosphoric acid to monocalcium phosphate.

In accordance with this invention an aqueous acidic phosphatic solution may be treated at any normal temperature typical of the stage wherein the solution has been withdrawn. If the solution has been obtained from a storage or surge tank the temperature may be from 80° to 150°F. If from a conventional filter the temperature will be from 110° to 180°F or if from a conventional evaporator, a range of 120° to 220°F may be expected. The process of the invention can be practiced under any desired temperature condition. The rate of the solution through the layer of perlite is directly proportional to the temperature. The clarification procedure is preferably performed at temperatures within the range of from 80° to about 250°F and more preferably in the range of 200° to 250°F. However, as herein set forth, higher or lower temperatures may be used.

Any good quality perlite of commerce that has been expanded and processed to produce a filter aid may be used. The perlite filter aid is mixed in water or aqueous acidic phosphatic solution and the float fraction removed. This may be done prior to coating the separation equipment wih a layer of substantially float-free perlite.

Steam introduced directly in the feed solution materially aids in heating and preparing the solution for primary centrifugation through the layer of perlite filter aid.

In order to give a fuller, clearer understanding of the invention, but with no intention to be limited thereunto, the following specific example is given.

EXAMPLE

Raw wet process weak phosphoric acid having a $P_2O_5$ concentration of approximately 30% was heated to 180°F at which point steam was introduced into the solution and heating continued until the temperature was approximately 220°F. The solution was then passed through a layer of perlite within the basket of a rotating centrifuge. The perforated stainless steel basket had previously been lined with polypropylene woven cloth to which had been added a layer of substantially float-free perlite filter aid.

The clarified solution from this step was evaporated under 18 inches Hg to 20 inches Hg vacuum until a concentration of 38% $P_2O_5$ to 39% $P_2O_5$ had been reached. The solution was removed from the evaporation equipment and the temperature adjusted to approximately 180° F and centrifuged again through a fresh layer of perlite. This clarified solution was then vacuum evaporated to 52% $P_2O_5$ to 53% $P_2O_5$, removed, and allowed to stand for about 90 minutes. The solution was decanted and the clear overflow again vacuum evaporated to 58.5% $P_2O_5$. A sample of this supernatent was bottled and allowed to stand for several days. The analysis of the feed acid and the final product is given below.

|  | Feed wt. % | Product wt. % |
| --- | --- | --- |
| $P_2O_5$ | 30.10 | 58.50 |
| $Fe_2O_3$ | 0.73 | 1.64 |
| $Al_2O_3$ | 0.83 | 1.84 |
| F | 0.33 | 0.70 |
| MgO | 0.30 | 0.60 |
| Suspended solids | 1.30 | 0.00 |

Another sample treated similarly to the above after 48 days at 34° to 35° F showed only 0.57% suspended solids.

While in the foregoing specification I have set out a specific process in considerable detail for the purpose of illustrating embodiments of my invention, it will be understood that such details may be varied widely by those skilled in the art without departing from the spirit of my invention.

I claim:

1. A process for the clarification of a wet process phosphoric acid solution containing from about 25 to about 35 % $P_2O_5$ and having finely divided organic and inorganic solids therein comprising the step of passing said solution through a layer of perlite filter aid so as to remove substantially all of said finely divided organic and inorganic solids.

2. The process of claim 1 wherein the wet process phosphoric acid solution is heated to a temperature in the range of from 80° to about 250°F and centrifuged through said perlite filter aid.

3. The process of claim 1 wherein the wet process phosphoric acid solution contains calcium in a $CaO/P_2O_5$ ratio of from 0:1 to about 1:1.

4. The process of claim 1 comprising the further steps of dehydrating the filtered wet process phosphoric acid solution to a concentration of from about 51 to 53% $P_2O_5$, holding said concentrated acid solution quiescently for a time up to 90 minutes so as to settle additional solids, decanting the resulting concentrated acid solution from the settled solids and further dehydrating said decanted acid solution to a concentration of from about 54 to 62% $P_2O_5$.

5. The process of claim 1 comprising the additional step of adding a flocculating agent to the wet process phosphoric acid solution prior to the step of passing said solution through the layer of perlite filter aid, said flocculating agent being added in an amount sufficient to provide from about 0.001 to about 2 pounds thereof per ton of solution.

* * * * *